(12) United States Patent
Bihel et al.

(10) Patent No.: US 11,161,601 B2
(45) Date of Patent: Nov. 2, 2021

(54) HYDRO-ELASTIC DAMPER AND AN AIRCRAFT

(71) Applicant: AIRBUS HELICOPTERS, Marignane (FR)

(72) Inventors: Jean-Romain Bihel, Le Rove (FR); Damien Sequera, Dos Hermanas (ES); Jean-Pierre Jalaguier, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 290 days.

(21) Appl. No.: 16/369,546

(22) Filed: Mar. 29, 2019

(65) Prior Publication Data
US 2019/0300163 A1 Oct. 3, 2019

(30) Foreign Application Priority Data

Mar. 30, 2018 (FR) ..................... 1870369

(51) Int. Cl.
*B64C 27/00* (2006.01)
*F16F 13/08* (2006.01)
*B64C 27/51* (2006.01)

(52) U.S. Cl.
CPC ............ *B64C 27/001* (2013.01); *B64C 27/51* (2013.01); *F16F 13/08* (2013.01)

(58) Field of Classification Search
CPC . B64C 27/001; B64C 2027/003; B64C 27/54; B64C 27/57; F16F 13/002; F16F 15/023; F16F 9/325; F16F 9/092; F16F 9/34
See application file for complete search history.

(56) References Cited

U.S. PATENT DOCUMENTS 3,091,449 A * 5/1963 Boutefoy .................. F16F 9/46
267/67
4,084,668 A 4/1978 Rybicki
5,178,241 A 1/1993 Aubry
(Continued)

FOREIGN PATENT DOCUMENTS

CN 102501970 A 6/2012
EP 1000274 B1 11/2002
(Continued)

OTHER PUBLICATIONS

Korean Notice of Preliminary Rejection dated Mar. 20, 2020 (with English Translation), Application No. 10-2019-0037179, Applicant Airbus Helicopters, 10 Pages.
(Continued)

*Primary Examiner* — Philip J Bonzell
*Assistant Examiner* — Ashesh Dangol
(74) *Attorney, Agent, or Firm* — Brooks Kushman P.C.

(57) ABSTRACT

A hydro-elastic damper comprising at least one elastic assembly comprising an elastic member between two strength members. The elastic assembly including a compression chamber. The hydro-elastic damper includes a damping assembly provided with an expansion chamber that is defined in a transverse direction by an end wall and by a piston. The compression chamber is hydraulically connected to the expansion chamber by three hydraulic connections comprising respectively: a duct; at least one first passage with an overpressure valve; and at least one second passage with a check valve.

19 Claims, 5 Drawing Sheets

(56) References Cited

U.S. PATENT DOCUMENTS

| | | | | |
|---|---|---|---|---|
| 6,978,871 | B2 * | 12/2005 | Holiviers | F16F 9/325 |
| | | | | 188/266.6 |
| 10,632,805 | B1 * | 4/2020 | Rositch | B60G 3/01 |
| 2003/0146343 | A1 | 8/2003 | Zoppitelli et al. | |
| 2010/0247288 | A1 * | 9/2010 | Russell | F16F 13/24 |
| | | | | 415/1 |
| 2012/0230823 | A1 | 9/2012 | Stamps et al. | |
| 2013/0164131 | A1 | 6/2013 | Russell | |
| 2013/0341140 | A1 * | 12/2013 | Nakajima | F16F 9/187 |
| | | | | 188/315 |
| 2016/0223044 | A1 | 8/2016 | Lin | |
| 2017/0043868 | A1 * | 2/2017 | Sequera | B64C 27/64 |

FOREIGN PATENT DOCUMENTS

| | | |
|---|---|---|
| EP | 2678222 B1 | 9/2014 |
| FR | 2592696 A1 | 7/1987 |
| FR | 2736890 A1 | 1/1997 |
| FR | 2950027 A1 | 3/2011 |
| WO | 2012148389 A1 | 11/2012 |
| WO | 2013152300 A2 | 10/2013 |

OTHER PUBLICATIONS

French Search Report for FR 1870369, Completed by the French Patent Office, dated Jan. 9, 2019, All together 6 Pages.

* cited by examiner

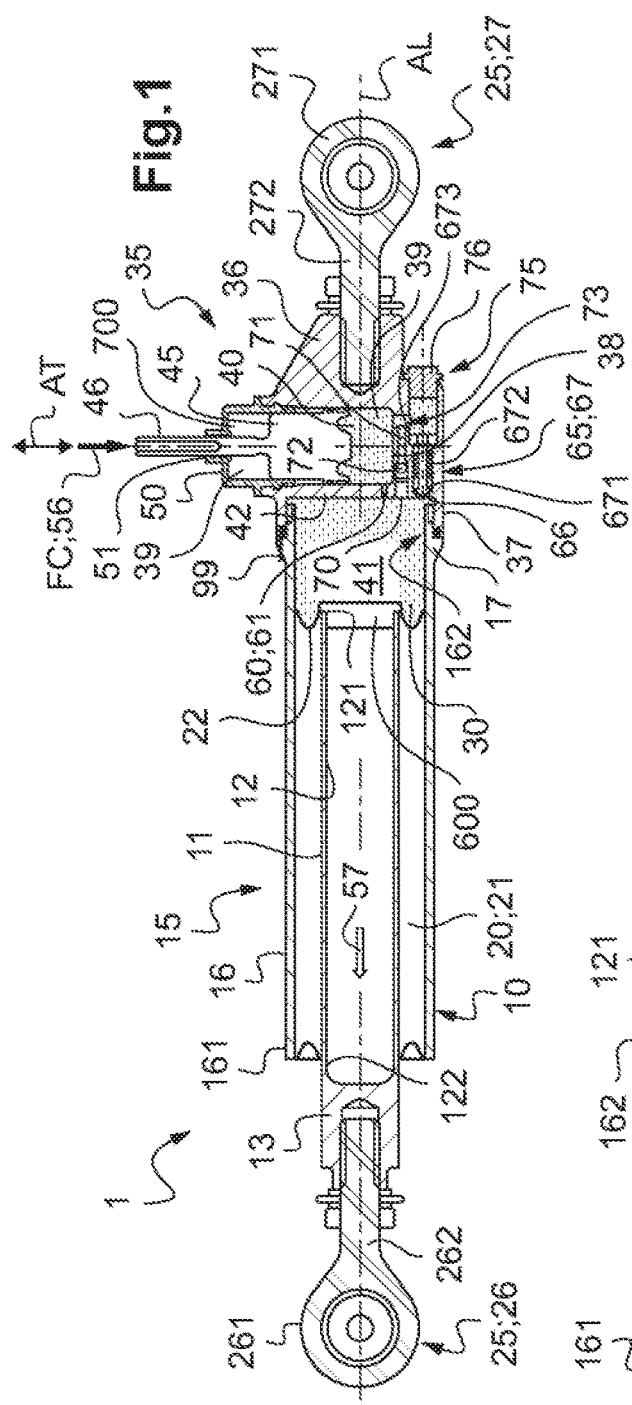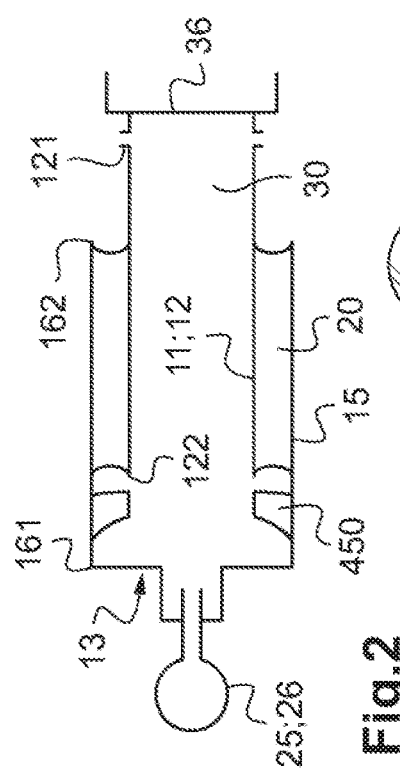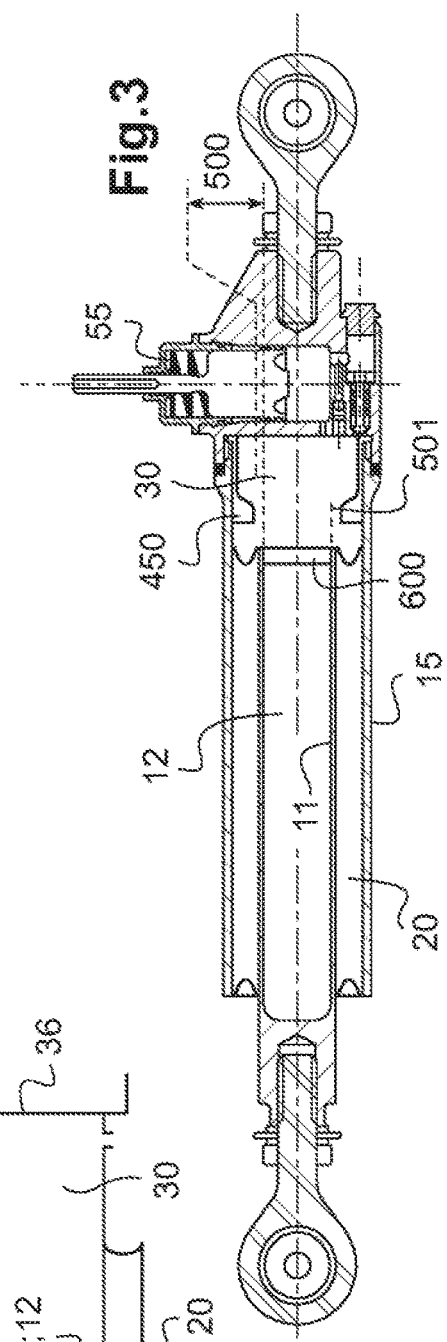

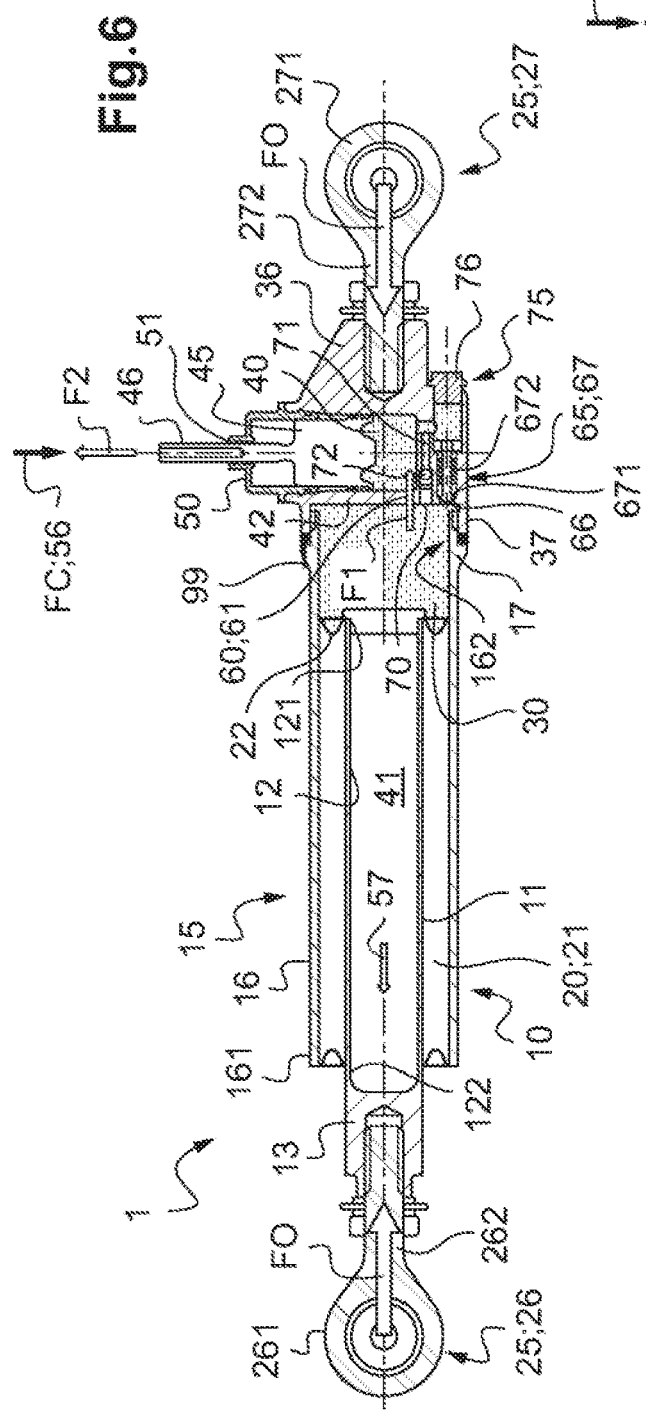
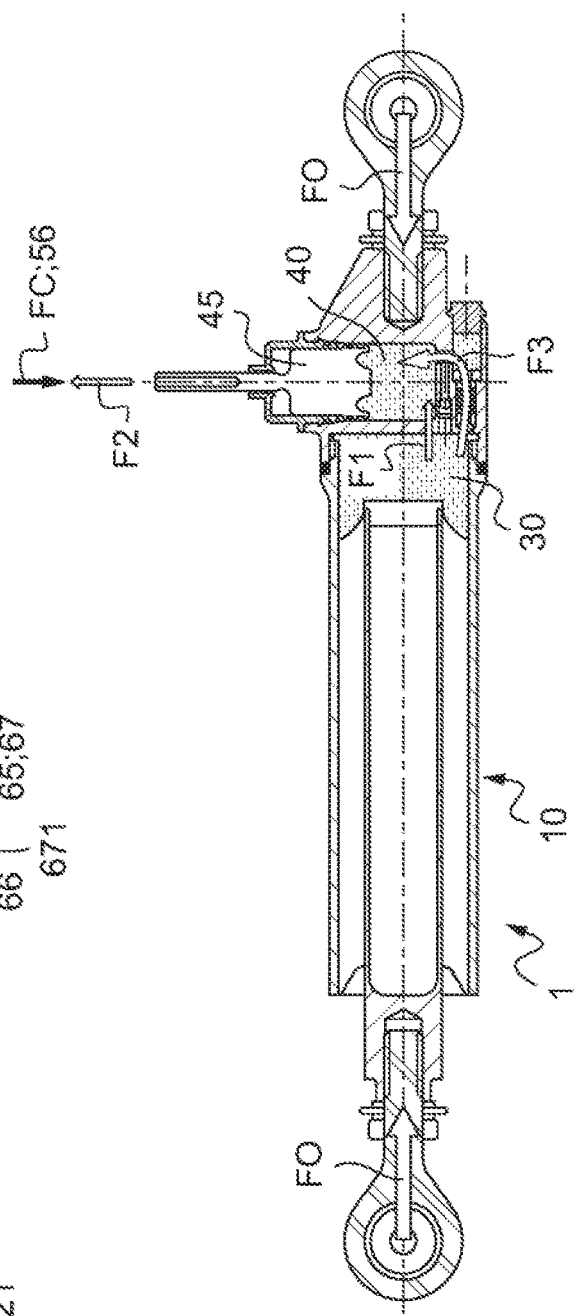

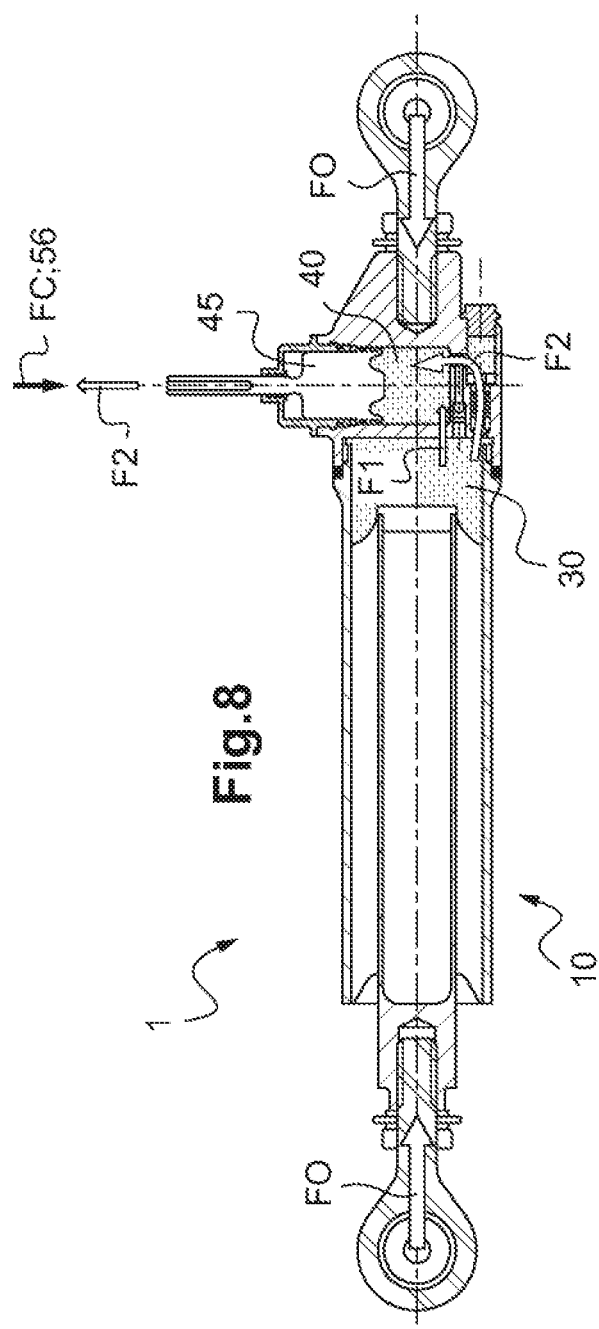
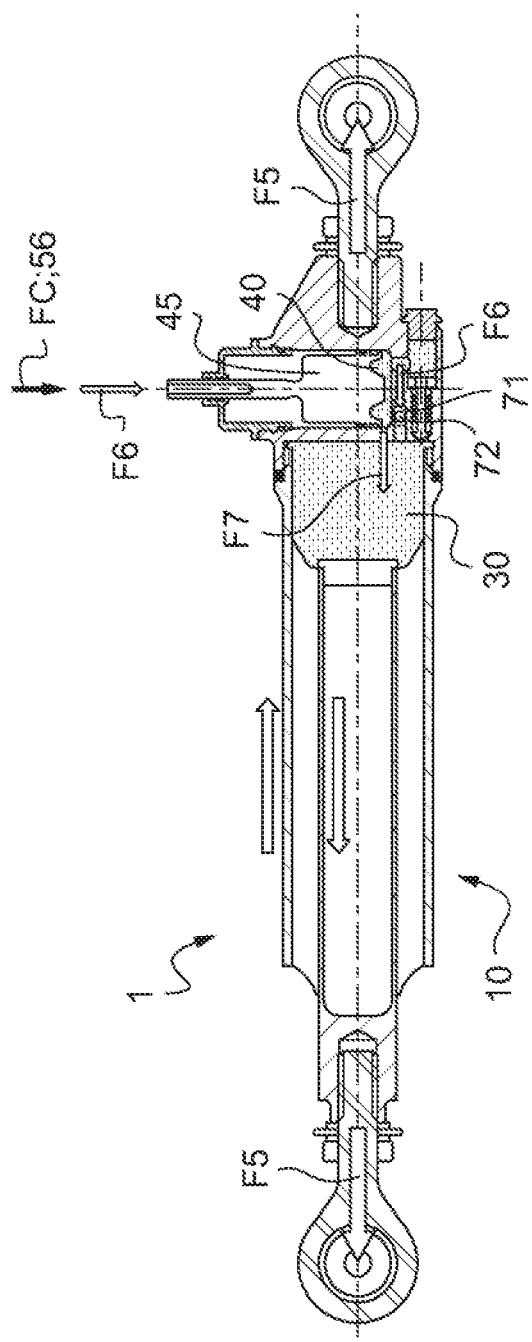

HYDRO-ELASTIC DAMPER AND AN AIRCRAFT

CROSS-REFERENCE TO RELATED APPLICATIONS

This application claims priority to French patent application No. FR 1870369 filed on Mar. 30, 2018, the disclosure of which is incorporated in its entirety by reference herein.

BACKGROUND OF THE INVENTION

(1) Field of the Invention

The present invention provides a hydro-elastic damper, and an aircraft including at least one hydro-elastic damper of this type.

(2) Description of Related Art

The invention relates to the general technical field of damping movements of a mechanical system, and more particularly of equipment including damper systems used in aviation.

A particular application of the invention lies in lead/lag dampers used on a rotor providing lift to a rotorcraft, and in particular to a helicopter. The invention is thus situated in the narrow technical field of lead/lag dampers.

On a helicopter rotor, a damper device may connect each blade to the hub of the rotor or may connect consecutive pairs of blades together. Such a damper device is referred in particular by the term "lead/lag damper" or sometimes as a "frequency adapter with incorporated damping".

Specifically, the combination of vertical flapping movement of the blades with the rotary drive movement of the blades about the axis of rotation of the rotor leads to the appearance of a Coriolis force, i.e. a periodic force that causes the blades to oscillate in their plane of rotation. Consequently, a damper device connected to a blade of a rotorcraft rotor serves firstly to damp the oscillations of the blade during its lead/lag movement. The stiffness specific to the damper device also limits the amplitude of the lead/lag movement of the blade in flight.

Such a damper device may serve secondly at least to limit the appearance of resonance phenomena known as "ground resonance" and as "air resonance".

A damper device may present stiffness determined so that the resonant frequency of the blades of a rotor in lead/lag movement is appropriate in order to satisfy the requirements for optimum operation of the rotor, e.g. when faced with the ground resonance phenomenon. Furthermore, the damper device may also be determined so as to damp the lead/lag movements of the blades in order to limit any risk of entering into ground resonance when the resonant frequency fixed-axis of the blades of the rotor during lead/lag movement is equal to an excitation frequency of the fuselage of the aircraft when standing on its landing gear.

Likewise, the damping provided by a damper device may contribute to combating the phenomenon of air resonance.

A damper device may then be determined so as to operate in compliance with a three-slope relationship that determines force as a function of the dynamic movement of the damper device. This relationship presents three distinct damping ranges depending on the dynamic movement stresses to which the damper is subjected. Specifically, the relationship presents a first segment corresponding to the operation required for combating the ground resonance phenomenon, a second segment corresponding to the operation required in flight, and a third segment for combating the phenomenon of air resonance.

In this context, one known damper device presents a hydraulic system only.

Another known damper device presents elastic return members only, such as springs or elastomer. Such a damper device is advantageous for avoiding entry into ground resonance. For example, light helicopters may have damper devices of this type, since such aircraft do not require strong damping in flight.

On a heavy helicopter, it is possible to use a different type of damper device that is said to be "hybrid". Such a hybrid damper device is in the form of a hydro-elastic damper that is provided with an elastic member and with a hydraulic system that are arranged in parallel. The hydraulic system provides the damping needed in flight.

Although effective, such a hydro-elastic damper is preferably arranged between a blade and a hub and not between two blades. Specifically, arranging a partially hydraulic damper device between two blades is difficult because of centrifugal force that results from the rotor rotating being exerted in particular on the various moving members of the elastic member. Such a partially hydraulic damper device is thus advantageously arranged between a blade and a hub. Nevertheless, that arrangement is sometimes difficult to obtain in an environment that contains other members, and for example pitch rods, and in the presence of a large number of blades.

Document FR 2 950 027 describes a device having a plurality of elastomer blocks.

Document CN 102501970 also describes a system having a plurality of elastomer blocks.

A known hydro-elastic damper is provided with a hydraulic system and with an elastic member that are arranged in parallel between two connection members.

A first connection member is secured to an "intermediate" strength member. The intermediate strength member comprises a ring carrying a piston.

A second connection member is secured to a "central" strength member and to an "outer" strength member, which are arranged radially on either side of the intermediate strength member. An elastomer annular block of the elastic member is secured to the intermediate strength member and to the outer strength member. Conversely, hydraulic chambers of a hydraulic system are defined by the intermediate and central strength members.

Movement of the first connection member relative to the second connection member then gives rise to combined stresses on the elastic member and on the hydraulic system.

Document FR 2 592 696 describes a damper device of that type.

Document EP 1 000 274 describes a hydro-elastic device.

Document US 2013/0164131 also describes a hydro-elastic damper. A first elastomer ring extends radially between an intermediate strength member and a central strength member, and a second elastomer ring extends radially between an intermediate strength member and an outer strength member.

Document EP 2 678 222 describes a hydro-elastic damper having a first connection member secured to a hydraulic system. A second connection member is secured to a strength member, an elastic member being interposed between the strength member and the hydraulic system. The connection member and the hydraulic system operate in series following a movement of the first connection member relative to the second connection member, i.e. one after the other.

Documents WO 2012/148389, WO 2013/152300, US 2012/230823, and US 2016/223044 are also known.

BRIEF SUMMARY OF THE INVENTION

An object of the present invention is thus to propose a hydro-elastic damper with both an elastic member and also a hydraulic system, and that is innovative and suitable for being arranged between two blades.

Such a hydro-elastic damper comprises at least one elastic assembly. This at least one elastic assembly comprises an inner strength member and an outer strength member that are movable relative to each other at least in translation along a longitudinal axis, in particular when the hydro-elastic damper is compressed or stretched. The outer strength member surrounds the inner strength member at least in part, said at least one elastic assembly comprising at least one elastic member connecting the outer strength member to the inner strength member.

By way of example, the inner strength member comprises a hollow inner cylinder extending along a horizontal axis from an outer end to an inner end, the outer strength member comprising a hollow outer cylinder that extends from a first extreme zone to a second extreme zone, the outer end or the first extreme zone being shut by a fastener end, a connection head being secured to the fastener end. The term "connection head" is used to designate a member of the damper configured to be connected to an element that does not form part of the damper, e.g. a lift assembly.

This at least one elastic assembly includes a compression chamber of volume that is variable as a function of the relative position of the inner strength member and of the outer strength member. By way of example, this compression chamber is defined at least in part by said fastener end and by said inner cylinder or by a plug shutting the inner cylinder. Compression of the hydro-elastic damper gives rise to a reduction in the volume of the compression chamber, whereas stretching the hydro-elastic damper gives rise to an increase in the volume of the compression chamber.

Furthermore, the hydro-elastic damper includes a damper assembly comprising a variable volume expansion chamber, the expansion chamber being defined in a transverse direction by an end wall and by a piston, the piston being movable in translation along the transverse direction. The transverse direction is not parallel to the longitudinal axis, and indeed it may coincide substantially with the direction followed by the centrifugal force that acts on the piston in operation. Said compression chamber is hydraulically connected to the expansion chamber by three hydraulic connections comprising respectively: a duct; at least one first passage with an overpressure valve configured to allow a fluid to flow only from the compression chamber towards the expansion chamber and only when the fluid in the compression chamber is at a pressure that exceeds a threshold, and thus when the hydro-elastic damper is compressed; and at least one second passage with a check valve configured to allow the fluid to flow only from the expansion chamber towards the compression chamber, and only when the fluid in the compression chamber is at a pressure less than the pressure of the fluid in the expansion chamber, and thus when the hydro-elastic damper is stretched. A fluid is arranged in the compression chamber, in the expansion chamber, and in the various connections.

When the hydro-elastic damper is compressed or stretched, the inner strength member and the outer strength member move relative to each other, thereby stretching the elastic member. The relative movement in translation between the inner strength member and the outer strength member gives rise to movement of the fluid between the compression chamber and the expansion chamber via at least one of the connections.

More precisely, when the hydro-elastic damper is compressed, a portion of the fluid present in the compression chamber moves into the expansion chamber via the first connection having said duct. The fluid is throttled as it passes through the duct, which is of small section. The hydro-elastic damper then follows the first slope of the above-described three-slope relationship. The pressure of the fluid in the compression chamber increases. The piston moves optionally against centrifugal force exerted on the piston, and possibly also while compressing a return spring. The volume of the expansion chamber then increases so as to receive the fluid coming from the compression chamber.

If compression continues, once the pressure of the fluid in the compression chamber exceeds a predetermined threshold, the overpressure valve opens in part. The fluid escapes from the compression chamber in particular through the second connection having the overpressure valve. The second connection may present a flow-passing section of area greater than the flow-passing section of the duct. The hydro-elastic damper then follows the second slope of the above-described three-slope relationship. The overpressure valve may be adjustable to enable its predetermined threshold to be adjusted.

If compression continues, the overpressure valve continues to open until it is open by a maximum amount. The hydro-elastic damper then follows the third slope of the above-described three-slope relationship.

Conversely, when the hydro-elastic damper is stretched, the pressure of the fluid in the compression chamber drops suddenly. The overpressure valve closes. Conversely, the check valve in the third connection opens. The expansion chamber empties immediately. The centrifugal force acting on the piston or indeed a spring or compressed air acting on the piston serve to move the piston quickly so that the fluid passes quickly from the expansion chamber towards the compression chamber. This provision seeks to avoid any problem with cavitation.

The hydro-elastic damper is thus a hybrid damper device that exerts damping essentially while it is being compressed. The compression chamber is not defined by the piston but may be defined by the elastic assembly or by the elastic assembly together with the damper assembly, thus making it possible to avoid or to limit the use of dynamic gaskets, which are sensitive to wear.

Such a hydro-elastic damper may in particular be used as an inter-blade damper on an aircraft rotor. During lead/lag movement of the blades, at least one damper is then necessarily compressed in order to provide damping, independently of the lead or lag direction of the movement of the blades. Specifically, since each blade is arranged between two inter-blade dampers, at least one inter-blade damper operates in compression.

In addition, the design of such a hydro-elastic damper may be modular. For example, the elastic assembly and the damper assembly may constitute two modules that can be fastened to each other in reversible and non-destructive manner, e.g. by screws or the equivalent.

Such a hydro-elastic damper may present the advantage of being suitable for being arranged on multiple different rotorcraft, including on heavy rotorcraft.

The hydro-elastic damper may also include one or more of the following characteristics.

In an aspect, the compression chamber may be defined axially at least by a plug shutting the inner end and by an edge of the elastic member, the compression chamber being defined radially at least by the outer cylinder.

The compression chamber may thus be closed axially by a wall secured to the outer strength member, i.e. a wall of the outer strength member, or by a casing of the damper assembly, for example.

In an aspect, the damper assembly may include a return spring urging the piston towards the end wall in a transverse way going from the piston towards the end wall.

Such a return spring can boost movement of the fluid from the expansion chamber towards the compression chamber(s) when the hydro-elastic damper is stretched.

In addition or alternatively, compressed air may be held captive in a chamber that is defined in part by the piston. The piston then subdivides a space into an expansion chamber and a chamber containing this air and/or the return spring. The air can behave like a spring.

In an aspect, the transverse direction may be orthogonal to the longitudinal axis.

This characteristic may serve to optimize the positioning of an axis for movement in translation of the piston.

In an embodiment, the transverse direction may present an angle with the longitudinal axis lying in a range 80 degrees included to 90 degrees included.

In an aspect, the transverse direction may be configured to be on the same axis as a centrifugal force exerted on the piston when said hydro-elastic damper is arranged on a rotor of an aircraft, said transverse way being configured to coincide with said centrifugal force.

Having the transverse direction for movement of the piston oriented in this way within a rotor can tend to optimize the lifetime of the piston, and/or in particular of a dynamic gasket secured to the piston, and/or of piston guide rings, . . . . The piston needs to move against centrifugal force when the hydro-elastic damper is compressed, possibly compressing a return spring. Conversely, centrifugal force facilitates moving the piston towards the end wall when the hydro-elastic damper is stretched.

In an aspect, the damper assembly may include a filler opening in fluid-flow communication with the expansion chamber, the filler opening being shut by a plug.

The compression and expansion chambers can then be filled through the filler opening.

In a first embodiment, hydro-elastic damper may have a single elastic assembly and said damper assembly is secured to a connection head in alignment with a connection head of said single elastic assembly.

The term "in alignment" means that the connection heads extend along the longitudinal axis. Furthermore, when the connection heads are heads provided with ball joints, each defining a hinge center, the connection heads have two respective hinge centers present on the longitudinal axis.

In a second embodiment, the hydro-elastic damper may comprise two elastic assemblies, said two elastic assemblies being positioned on either side of the expansion chamber, two connection heads of the two elastic assemblies being in alignment.

The hydro-elastic damper then has a hydraulic body positioned between two elastic assemblies. Each elastic assembly defines a respective compression chamber that is connected to the expansion chamber via at least three connections. When the hydro-elastic damper is compressed, both elastic assemblies are compressed and both expel fluid into the expansion chamber.

Compared with the first embodiment, and when subjected to equivalent stress, the inner and outer strength members of each elastic assembly move relative to each other over a distance of about half the distance that would be traveled by a strength member in the first embodiment. The two elastic blocks in the second embodiment may optionally be smaller and/or may present an optimized lifetime.

Independently of the embodiment, the second extreme zone or the inner end may be configured to be secured to the damper assembly.

This arrangement can facilitate obtaining an architecture that is modular.

Alternatively, the outer strength member or the inner strength member may be a portion of a casing that defines the expansion chamber.

In another aspect, the damper assembly may comprise a casing forming a cavity in which said piston slides to form said expansion chamber, said casing having said three connections passing locally therethrough and associated with each elastic assembly.

A wall of the casing thus forms the end wall of the cavity, with the expansion chamber being defined by that end wall and the piston. The piston thus subdivides the cavity in order to define the expansion chamber.

In another aspect, the damper assembly may include a seat fastened to the casing, a return spring optionally bearing against said seat, said damper assembly including at least one rod secured to the piston, said rod being mounted to slide through a guide orifice of said seat.

For example, the seat may be screwed to the casing. The seat may be in the form of a plug.

The rod may also constitute a visible indicator for estimating the position of the piston, and thus the level of fluid in the damper. If the rod is pushed in too far relative to a reference position, an operator can deduce that there is a leak of liquid. By way of example, such a reference position may be given by a mark on the rod.

In another aspect, the damper assembly may include a wall having said three connections passing therethrough, said wall defining said compression chamber in part.

The wall may be a wall of a casing of the damper assembly or a wall shutting an outer cylinder of the outer strength member, for example.

In another aspect, the damper assembly may include a connection cylinder fastened to an outer cylinder of said outer strength member or to the inner cylinder by reversible fastener means.

Reversible fastener means are means that are not destructive, and by way of example they may comprise screw fastener means, and/or staple means, and/or pin means, . . . .

The outer strength member or the inner strength member of an elastic assembly may then be fastened to a casing of the damper assembly. Optionally, a static gasket may be positioned between the outer strength member or the inner strength member and the casing. Specifically, in the event of compression or stretching, the inner strength member is caused to move relative to the outer strength member.

In another aspect, the connection cylinder may bear against a shoulder of said outer cylinder.

In another aspect, the elastic member comprises at least one elastomer block.

In another aspect, said at least one elastic assembly includes a buffer arranged in the compression chamber with radial clearance extending between said buffer and a geometrical cylinder, the geometrical cylinder containing an interface between the elastic member and one of said inner and outer strength members that does not have the buffer, said buffer facing an edge of said elastic member along the longitudinal axis.

Such a buffer may contribute to protecting the elastic member by tending to protect the edge of the elastic member from pressure peaks in the compression chamber and/or by preventing hot fluid from flowing to that edge.

Furthermore, an aircraft may be provided with a rotor contributing at least to providing the aircraft with lift, said rotor comprising a hub carrying a plurality of lift assemblies, and at least one hydro-elastic damper of the invention.

In particular, the rotor may include inter-blade hydro-elastic dampers.

Under such circumstances, each lift assembly is arranged circumferentially between two other lift assemblies and is connected to those two other lift assemblies by two respective hydro-elastic dampers. Each hydro-elastic damper is then hinged to a blade and to an adjacent blade.

BRIEF DESCRIPTION OF THE DRAWINGS

The invention and its advantages appear in greater detail in the context of the following description of embodiments given by way of illustration and with reference to the accompanying figures, in which:

FIG. 1 shows diagrams of a hydro-elastic damper provided with an elastic assembly;

FIG. 2 is a diagram showing a hydro-elastic damper provided with an outer strength member having a fastener end;

FIG. 3 is a diagram showing a hydro-elastic damper provided with a buffer;

FIGS. 6 to 9 are diagrams explaining the operation of a hydro-elastic damper of the invention;

DETAILED DESCRIPTION OF THE INVENTION

Figure 4:
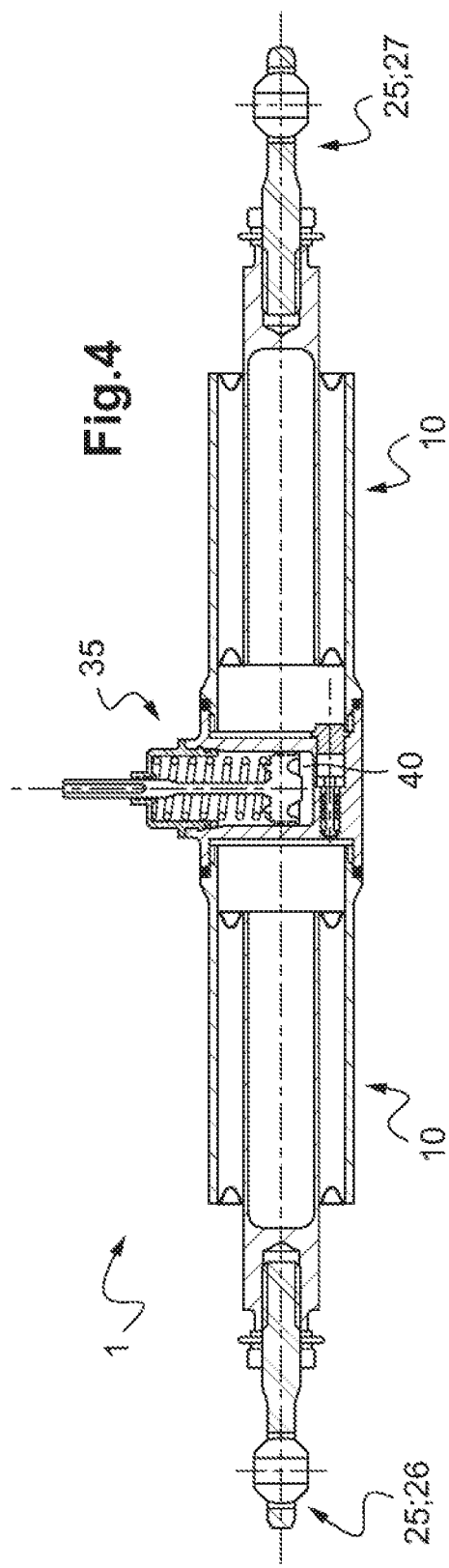
FIG. 4 is a diagram showing a hydro-elastic damper having two elastic assemblies.

FIG. 1 shows an embodiment of a hydro-elastic damper of the invention.

Independently of the embodiment, the hydro-elastic damper 1 includes at least one elastic assembly 10.

Each elastic assembly 10 includes an inner strength member 11. This inner strength member 11 may be a single piece, or it may comprise a plurality of parts fastened to one another.

The inner strength member 11 may comprise an inner cylinder 12 that is hollow. By way of example, the inner cylinder 12 may have a base that is circular or of some other shape, e.g. a base of polygonal shape. The inner cylinder may extend longitudinally along a longitudinal axis AL from an "inner" end 121 to an "outer" end 122. The longitudinal axis AL may be an axis of symmetry of the inner cylinder. Compression and stretching forces exerted on the hydro-elastic damper may possibly be directed along this longitudinal axis AL.

Each elastic assembly further comprises an outer strength member 15. The outer strength member 15 may be a single piece, or may comprise a plurality of parts fastened to one another.

The outer strength member 15 surrounds the inner strength member 11 at least in part, and for example it surrounds at least a portion of the inner cylinder 12.

Thus, the outer strength member 15 may comprise an outer cylinder 16 that is hollow. The outer cylinder 16 may surround the inner cylinder 12, at least in part. The outer cylinder 16 and the inner cylinder 12 may be coaxial. By way of example, the outer cylinder 16 may have a base that is circular, or of some other shape. The outer cylinder 16 may extend longitudinally along the longitudinal axis AL from an end portion referred to as a "first extreme zone" 161 to a second end portion referred to as a "second extreme zone" 162.

Furthermore, each elastic assembly 10 comprises an elastic member 20 connecting the outer strength member 15 to the inner strength member 11 and allowing at least one degree of freedom to move in translation along the longitudinal axis AL for the inner strength member relative to the outer strength member.

The elastic member 20 extends radially, i.e. perpendicularly to the longitudinal axis AL between at least one face of the inner cylinder 12 and one face of the outer cylinder 16 that face each other.

The elastic member 20 may comprise at least one elastomer block 21, and in particular an elastomer block fastened to the inner cylinder and to the outer cylinder. The elastic member may thus comprise one or more annular elastomer blocks.

The elastic member may comprise elastic subassemblies of some other type, e.g. springs or the equivalent.

The term "elastic member" is thus used to designate a subassembly connecting the inner strength member to the outer strength member and that deforms elastically in the event of relative movement in translation between the inner strength member 11 and the outer strength member 15.

In the alternative of FIG. 1, the inner strength member 11 may have a fastener end 13 that extends along the longitudinal axis AL of the inner cylinder 12, being adjacent to the outer end 122. This fastener end 13 closes the inner cylinder at its outer end 122, while on the contrary the inner end 121 is open to the outside, and possibly shut by a plug 600. The fastener end 13 may be fastened to the inner cylinder 12 by conventional means such as screw fastening, welding, riveting, . . . , or the fastener end 13 and the inner cylinder 12 may constitute two segments of a single piece. Independently of this aspect, the inner strength member 11 thus presents a C-shape in longitudinal section and defines an inside space that is open to the outside of this inner strength member at the inner end 121, which is optionally shut by the plug 600.

Furthermore, a connection head 25, referred to as the "first" connection head 26 is secured to the fastener end 13. This first connection head 26 is constrained at least in translation to move along the longitudinal axis AX together with the inner strength member 11. This first connection head 26 may be integrated in the inner strength member 11 or it may be fastened thereto by conventional means. For example, the first connection head 26 has a hinged head 261 secured to a leg 262, the hinged head 261 possibly being provided with a ball joint centered on the longitudinal axis AL, and/or the leg 262 possibly being screwed to the fastener end 13.

In addition, the first extreme zone 161 may be open. The second extreme zone 162 may be open as in the example of FIG. 1, but it could also be shut by a pierced wall. In the example of FIG. 1, the first extreme zone 161 surrounds the inner strength member, while the second extreme zone 162 projects longitudinally beyond the inner end 121 of the inner strength member 11.

In the alternative of FIG. 2, the fastener end 13 is secured not to the inner strength member but to the outer strength member 15. The outer strength member 15 then includes the fastener end 13 that extends the outer cylinder 16 along the longitudinal axis AL, being adjacent to the first extreme zone 161.

Independently of the alternative, and with reference to FIG. 1, the hydro-elastic damper 1 includes one compression chamber 30 for each elastic assembly 10. Each compression chamber 30 is thus arranged in particular within the corresponding elastic assembly 10, e.g. being defined at least in part by one of the strength members. Optionally, the inner end 121 is shut by a plug 600 in order to minimize the volume of the compression chamber so that the inside space defined by the inner cylinder does not form part of the compression chamber. For example, a compression chamber 30 is defined axially in a longitudinal way 57 parallel to the longitudinal axis AL by the plug 600 and an edge 22 of the elastic member 20 of an elastic assembly, and is defined radially at least by the outer strength member 15. The compression chamber 30 may be defined axially in a way opposite to the longitudinal way 57 by a wall 42 of the outer strength member 15 or by some other member of the hydro-elastic damper 1.

Each compression chamber 30 presents a volume that varies as a function of the relative position of the inner strength member 11 and of the outer strength member 15 of the corresponding elastic assembly. In particular, the volume of the compression chamber 30 decreases when the hydro-elastic damper is compressed and it increases when the hydro-elastic damper is extended.

In another aspect, FIG. 3 shows the possibility of arranging a buffer 450 in the compression chamber 30. By way of example, this buffer 450 is adjacent either to the inner strength member 11 or else to the outer strength member 15, and specifically to the outer strength member 15 in the example shown. The buffer 450 is fastened to a strength member or to some other member of the damper. Radial clearance 500 lies between said buffer 450 and a geometrical cylinder 501 so that the buffer does not impede relative movement between the inner strength member and the outer strength member, the geometrical cylinder 501 containing a face of the elastic member 20 arranged against one of said inner and outer strength members 11 and 15 that does not have the buffer 450. The buffer 450 faces an edge 22 of said elastic member 20 along the longitudinal axis AL, axial clearance lying between the buffer 450 and the edge 22. The buffer 450 can serve to create head loss in order to protect the edge 22 of the elastic member from pressure peaks arriving in the compression chamber and to reduce heat exchange between a hot zone of the compression chamber and the elastic member.

According to another aspect, and with reference to FIG. 1, the hydro-elastic damper 1 includes a damper assembly 35 having an expansion chamber 40 of variable volume and optionally a single expansion chamber 40.

In the alternative of FIG. 1, the second extreme zone 162 of each outer strength member is configured to be secured to the damper assembly 35. In another alternative, the inner end of the inner strength member may be configured to be secured to the damper assembly 35.

In another aspect and in the first embodiment of FIG. 1, the hydro-elastic damper 1 has a single elastic assembly 10. Under such circumstances, the damper assembly 35 may be secured to a connection head 25 referred to as the "second" connection head 27. This second connection head 27 is constrained to move at least in translation along the longitudinal axis AL together with the damper assembly 35, this damper assembly 35 being secured to the outer strength member at least for movement in translation along the longitudinal axis AL, or to the inner strength member, depending on the alternative selected. This second connection head 27 may be integrated in the damper assembly or it may be fastened thereto by conventional means. For example, the second connection head 27 includes a hinged head 271 secured to a leg 272, the hinged head 271 possibly being provided with a ball joint centered on the longitudinal axis AL and/or the leg possibly being screwed to the damper assembly 35.

In the second embodiment of FIG. 4, the hydro-elastic damper 1 has two elastic assemblies 10. The two elastic assemblies 10 are positioned on either side of the expansion chamber 40. This damper assembly 35 is secured to at least one outer strength member at least for movement in translation along the longitudinal axis AL, or to at least one inner strength member, depending on the alternative. The connection heads 25 of the two elastic assemblies 10 are in alignment.

Independently of the embodiment, and with reference to FIG. 1, the expansion chamber 40 is arranged in a cavity 39 of the damper assembly. In particular, the expansion chamber is defined in a transverse direction AT by an end wall 38 of the cavity 39 and by a piston 45. The piston 45 thus separates the expansion chamber 40 from a return chamber in the cavity 39. The piston 45 is movable in translation within the cavity along the transverse direction AT. The transverse direction AT may be orthogonal or substantially orthogonal to the longitudinal axis AL. The transverse direction AT may lie on the same axis as the centrifugal force FC as described below, or it may lie substantially on that axis.

Under such circumstances, the expansion chamber 40 has a volume that varies as a function of the position of the piston in the cavity 39, with variation of this volume causing the piston to move. A return spring 55 and/or compressed air 700 may be arranged in the return chamber in order to exert a force on the piston that urges the piston 45 towards the end wall in a transverse way 56 going from the piston towards the end wall. The term "return spring" 55 may refer to a spring as such, or more generally to resilient equipment.

Optionally, the transverse direction AT may be configured to lie on the same axis as a centrifugal force FC that is exerted on the piston 45 in operation, or it may lie substantially on the same axis as this centrifugal force FC, i.e. it may depart from the centrifugal force FC by an acute angle that is less than or equal to 15 degrees. Likewise, the transverse way 56 may be configured to coincide with said centrifugal force FC or to be substantially on the same axis as said centrifugal force FC, i.e. to depart from the centrifugal force FC by an acute angle less than or equal to 15 degrees.

The expansion chamber 40 and the compression chamber(s) 30 are then filled with a fluid 41, possibly a liquid, e.g. oil. The damper assembly 45 optionally includes a filler opening 75 that is in fluid-flow communication with the expansion chamber 40 in order to introduce fluid into the hydro-elastic damper 1. This filler opening 75 is shut by a plug 76.

Furthermore, the expansion chamber 40 is hydraulically connected to each compression chamber 30 by at least three hydraulic connections 60, 65, and 70, and possibly by only three hydraulic connections 60, 65, 70 per compression chamber.

Each connection 60, 65 and 70 includes at least one pipe or the equivalent forming a passage in which the fluid flows.

Thus, a first connection 60 comprises a single duct 61 in which the fluid is throttled as it passes along this duct. The duct may comprise one or more passages in fluid-flow communication. The duct may present a section that is constant or it may include a constriction having a section of area that is smaller than the other sections of the duct.

A second connection 65 includes at least a first passage 66 and an overpressure valve 67. This overpressure valve 67 is configured to allow the fluid to flow in the second connection only from a compression chamber 30 towards the expansion chamber 40 and only when the fluid in the compression chamber 30 is at a pressure that exceeds a threshold.

By way of example, the overpressure valve may comprise a finger 671 secured to a spring 672, the spring 672 urging the finger 671 against the first passage 66 in order to shut it. The spring 672 may also extend between the finger 671 and a nut 673 that is movable in translation and that is pierced in its center. The nut 673 may be tightened or loosened in order to adjust the "pre-load" on the spring 672. Adjusting the pre-load on the spring 672 serves to adjust the pressure threshold in the compression chamber at which the finger 671 moves away from the first passage 66 so as to allow fluid to flow. A second nut serves to adjust the opening stroke of the overpressure valve in order to adjust the curve followed by the beginning of the third slope. Other types of overpressure valve may be used.

A third connection 70 includes at least a second passage 71 and a check valve 73. The check valve 73 is configured to allow fluid to flow in the third connection only from the expansion chamber 40 towards the compression chamber 30 and only when the pressure of fluid in the compression chamber 30 is at a pressure lower than the pressure of fluid in the expansion chamber 40.

By way of example, the check valve may comprise a movable ball 72 suitable for shutting or not shutting the second passage 71.

In the example of FIG. 1, the damper assembly 35 may include a casing 36. The casing 36 may comprise a single piece or it may be made up of a plurality of parts fastened to one another. The casing 36 serves in particular to define a cavity 39 in which the piston 45 slides. A dynamic gasket may be arranged between the piston 45 and the casing 36. A seat 50 may be fastened to the casing 36 in order to define the cavity 39, with the piston 45 then subdividing the cavity in order to split it into an expansion chamber 40 and a working chamber. The return spring 55, if any, may then bear against the seat 50 and a face of the piston 45, the return spring 55 extending in the working chamber. Optionally, at least one rod 46 is secured to move in translation with the piston 45. The rod 46 may be mounted to slide through a guide orifice 51 in the seat 50. The seat may also include a fluid-level sight-glass. The rod 46 may include at least one mark for identifying its position relative to a reference position.

Furthermore, the casing 36 has the three connections 60, 65, and 70 associated with each elastic assembly passing therethrough, the connections being in fluid-flow communication with the expansion chamber 40.

Thus, the duct 61 of the first connection 60 extends at least in the casing.

Furthermore, a first passage and the overpressure valve of the second connection may also be present in the casing 36.

Likewise, the second passage 71 and the check valve 70 of the third connection may also be present, at least in the casing 36.

A wall 42 of the casing 36 may thus have the three connections 60, 65, and 70 passing therethrough. This wall 42 may optionally define part of the compression chamber 30 along the longitudinal axis. Optionally, a partition of an elastic assembly secured to the inner strength member or to the outer strength member may also have the connections 60, 65, and 70 passing therethrough.

Furthermore, the damper assembly 35 and optionally the casing 36 may include one connection cylinder 37 for each elastic assembly. Depending on the elastic assembly alternative, the connection cylinder 37 may be fastened to the outer cylinder 16 or to the inner cylinder 12 by reversible fastener means 99. By way of example, these reversible fastener means 99 may comprise screws. The connection cylinder 37 may bear against a shoulder 17 of the outer cylinder 16 or of the inner cylinder, depending on the variant. A static gasket may be arranged between the connection cylinder 37 and the cylinder of the elastic assembly fastened to the connection cylinder.

Figure 5:
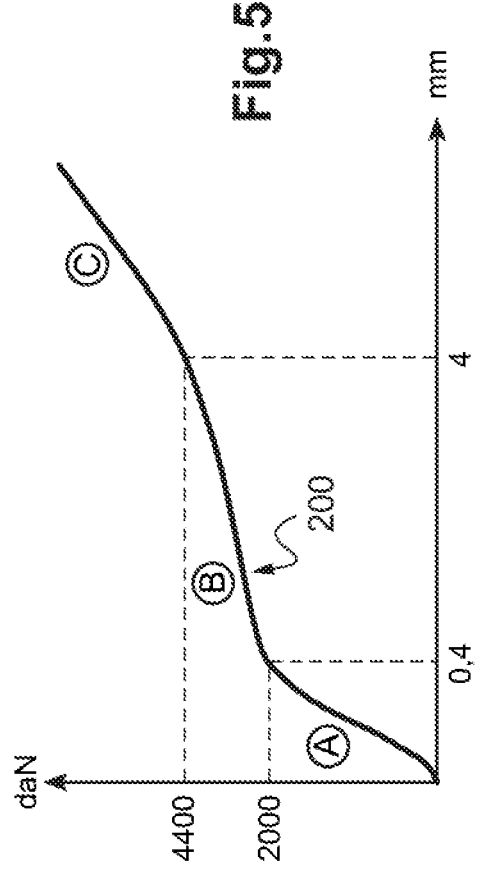
FIG. 5 is a graph plotting a three-slope relationship applied by the hydro-elastic damper of FIGS. 1 to 6.

FIG. 5 is a graph plotting a compression force that varies as a function of the movement of the inner strength member relative to the outer strength member in a hydro-elastic damper of the invention. This graph plots said movement in millimeters (mm) along the abscissa axis and said force in decanewtons (daN) up the ordinate axis. The force follows a relationship 200 having three slopes A, B, and C. The numbers shown are given by way of example.

FIGS. 1 and 6 to 9 explain the operation of the hydro-elastic damper 1. This operation is described using the embodiment of FIG. 1 for convenience. Nevertheless, the other variants of the invention operate in the same manner.

FIG. 1 shows the hydro-elastic damper 1 at rest.

With reference to FIG. 6, when the hydro-elastic damper is compressed, the first connection head 26 and the second connection head 27 move longitudinally towards each other along arrows F0. This movement is made possible by the inner strength member 11 moving relative to the outer strength member 15 in each elastic assembly by deforming the corresponding elastic member 20.

Under such circumstances, the volume of the compression chamber 30 is reduced, with the fluid 41 that escapes from the compression chamber 30 passing through the constriction in the duct of the first connection along arrow F1. The volume of the expansion chamber 40 increases, with the piston 45 moving away from the end wall along arrow F2 against centrifugal force, and compressing a return spring 55, if any. The hydro-elastic damper 1 then behaves by following the first slope A of the relationship 200.

With reference to FIG. 7, if the compression continues, then the pressure that exists in the compression chamber 30 increases. Once this pressure exceeds the threshold for opening the overpressure valve, which overpressure valve opens progressively, the fluid 41 escapes from the compression chamber 30 via the duct along arrow F1 and via the second connection along arrow F3. The flow rate of the fluid passing through the overpressure valve increases progressively with the progressive opening of the valve. The hydro-elastic damper thus follows the second slope B of the relationship 200.

With reference to FIG. 8, if compression continues, the overpressure valve opens fully. The term "fully" means that the overpressure valve is in abutment and cannot open any more. The hydro-elastic damper then follows the third slope C of the above-described three-slope relationship 200.

With reference to FIG. 9, when the hydro-elastic damper is stretched, the first connection head 26 and the second connection head 27 move apart from each other longitudinally along arrows F5. The pressure of the fluid 41 in the compression chamber 30 drops suddenly and the overpressure valve closes. Conversely, the check valve 72 of the third connection opens. For example, a ball 721 moves along arrow F6 so that it no longer shuts the second passage 723. The expansion chamber 40 empties. The piston 45 moves along arrow F6 towards the end wall so as to contribute to removing fluid from the expansion chamber. Centrifugal force FC, and force from the return spring 55 if any, facilitate this movement given the orientation of the movement axis of the piston.

Figure 10:
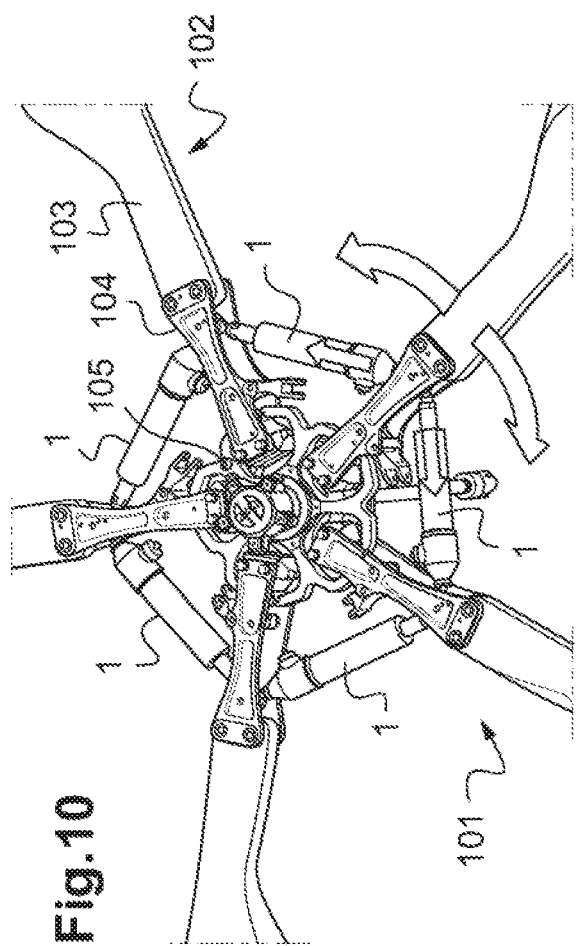
FIG. 10 is a diagram showing a rotor provided with hydro-elastic dampers of the invention.

With reference to FIG. 10, such a hydro-elastic damper 1 may advantageously be fastened to two adjacent lift assemblies of a rotor 101.

A rotor 101 of the invention may thus comprise a hub 105 carrying a plurality of lift assemblies 102. By way of example, each lift assembly 102 may comprise a blade 103 that is attached directly to the hub, e.g. via a spherical abutment, or indeed a blade 103 that is connected to a connection member 104 that is itself connected to the hub. By way of example, a lift assembly 102 may comprise a blade with a cuff integrated therein or a blade that is fastened to a cuff. Under such circumstances, each lift assembly is connected to two other lift assemblies via two respective hydro-elastic dampers 1.

Each hydro-elastic damper 1 is then hinged by its first connection head to one lift assembly, e.g. its cuff, and by its second connection head to another lift assembly, e.g. a cuff of the other lift assembly.

Figure 11:
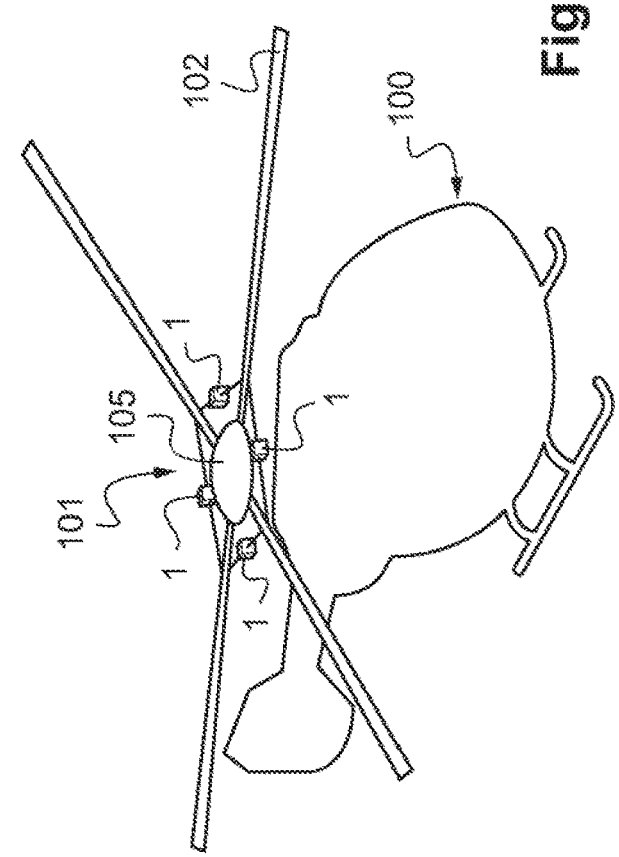
FIG. 11 is a diagram showing an aircraft provided with hydro-elastic dampers of the invention.

FIG. 11 shows an aircraft 100 of the invention.

In particular, the aircraft 100 may comprise an airframe carrying a rotor 101 of the type shown in FIG. 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A hydro-elastic damper comprising at least one elastic assembly, the at least one elastic assembly comprising an inner strength member and an outer strength member that are movable relative to each other at least in translation along a longitudinal axis, the at least one elastic assembly comprising an elastic member connecting the outer strength member to the inner strength member,
wherein the at least one elastic assembly includes a compression chamber of volume that is variable as a function of the relative position of the inner strength member and of the outer strength member, the hydro-elastic damper including a damper assembly comprising a variable volume expansion chamber, the expansion chamber being defined in a transverse direction by an end wall and by a piston, the piston being movable in translation along the transverse direction, a fluid being arranged in the compression chamber and the expansion chamber, the compression chamber being hydraulically connected to the expansion chamber by three hydraulic connections comprising respectively: a duct; at least one first passage with an overpressure valve configured to allow fluid to flow only from the compression chamber towards the expansion chamber and only when the fluid in the compression chamber is at a pressure that exceeds a threshold; and at least one second passage with a check valve configured to allow the fluid to flow only from the expansion chamber towards the compression chamber and only when the fluid in the compression chamber is at a pressure less than the pressure of the fluid in the expansion chamber, wherein the piston is spaced from the compression chamber and disposed within a casing defining at least in part the expansion chamber.

2. The hydro-elastic damper according to claim 1, wherein the outer strength member surrounds the inner strength member at least in part, the inner strength member comprising a hollow inner cylinder extending along a longitudinal axis from an outer end to an inner end, the outer strength member comprising an outer cylinder that extends from a first extreme zone to a second extreme zone, the outer end or the first extreme zone being shut by a fastener end, a connection head being secured to the fastener end, the compression chamber being defined at least in part by the fastener end and the inner cylinder.

3. The hydro-elastic damper according to claim 2, wherein the compression chamber is defined axially at least by a plug shutting the inner end and by an edge of the elastic member, the compression chamber being defined radially at least by the outer cylinder.

4. The hydro-elastic damper according to claim 1, wherein the transverse direction is orthogonal to the longitudinal axis.

5. The hydro-elastic damper according to claim 1, wherein the transverse direction is configured to be on the same axis as a centrifugal force exerted on the piston when the hydro-elastic damper is arranged on a rotor of an aircraft, or to present an angle less than or equal to 15 degrees relative to the centrifugal force, a transverse way going from the piston towards the end wall being configured to coincide with the centrifugal force.

6. The hydro-elastic damper according to claim 1, wherein the damper assembly includes a filler opening in fluid-flow communication with the expansion chamber, the filler opening being shut by a plug.

7. The hydro-elastic damper according to claim 1, wherein the hydro-elastic damper has a single elastic assembly and the damper assembly is secured to a connection head in alignment with a connection head of the single elastic assembly.

8. The hydro-elastic damper according to claim 1, wherein the hydro-elastic damper comprises two elastic assemblies, the two elastic assemblies being positioned on either side of the expansion chamber, two connection heads of the two elastic assemblies being in alignment.

9. The hydro-elastic damper according to claim 2, wherein the second extreme zone or the inner end is configured to be secured to the damper assembly.

10. A hydro-elastic damper according to claim 1, wherein the damper assembly comprises a casing forming a cavity in which the piston slides to form the expansion chamber, the casing having the three connections passing locally therethrough.

11. The hydro-elastic damper according to claim 10, wherein the damper assembly includes a seat fastened to the casing, the damper assembly including at least one rod secured to the piston, the rod being mounted to slide through a guide orifice of the seat.

12. The hydro-elastic damper according to claim 1, wherein the damper assembly includes a wall having the three connections passing therethrough, the wall defining the compression chamber in part.

13. The hydro-elastic damper according to claim 1, wherein the elastic member comprises at least one elastomer block.

14. The hydro-elastic damper according to claim 1, wherein the damper assembly includes a return spring or compressed air urging the piston towards the end wall along a transverse way.

15. The hydro-elastic damper according to claim 1, wherein the at least one elastic assembly includes a buffer arranged in the compression chamber with radial clearance extending between the buffer and a geometrical cylinder, the geometrical cylinder containing an interface between the elastic member and one of the inner and outer strength members that does not have the buffer, the buffer facing an edge of the elastic member along the longitudinal axis.

16. The hydro-elastic damper according to claim 1, wherein the compression chamber is not defined by the piston.

17. An aircraft provided with a rotor contributing at least to providing the aircraft with lift, the rotor comprising a hub carrying a plurality of lift assemblies, wherein the rotor includes at least one hydro-elastic damper according to claim 1 fastened to at least one lift assembly.

18. The aircraft according to claim 17, wherein each lift assembly is arranged circumferentially between two of the lift assemblies and is connected to those two lift assemblies by two respective hydro-elastic dampers.

19. A hydro-elastic damper comprising an elastic assembly, the elastic assembly comprising an inner strength member and an outer strength member, the inner and outer strength members movable relative to each other in translation along a longitudinal axis, the elastic assembly comprising an annular elastic member extending radially between and connecting the outer strength member to the inner strength member, wherein the elastic assembly includes a compression chamber defined by the inner and outer strength members and having a volume variable as a function of the relative position of the inner strength member and of the outer strength member, the hydro-elastic damper including a damper assembly comprising a variable volume expansion chamber, the expansion chamber extending in a transverse direction to the longitudinal axis and is defined by an end wall and by a piston, the piston movable within the expansion chamber in translation along the transverse direction, a fluid arranged in, and in fluid communication with, the compression chamber and the expansion chamber, the compression chamber being hydraulically connected to the expansion chamber by three hydraulic connections comprising respectively: a duct; at least one first passage with an overpressure valve configured to allow fluid to flow only from the compression chamber towards the expansion chamber and only when the fluid in the compression chamber is at a pressure that exceeds a threshold; and at least one second passage with a check valve configured to allow the fluid to flow only from the expansion chamber towards the compression chamber and only when the fluid in the compression chamber is at a pressure less than the pressure of the fluid in the expansion chamber, wherein the piston is spaced from the compression chamber and disposed within a casing defining at least in part the expansion chamber.

\* \* \* \* \*